US012764063B2

(12) United States Patent
Sajassi et al.

(10) Patent No.: US 12,764,063 B2
(45) Date of Patent: Oct. 13, 2026

(54) ADAPTIVE FILTERING OF BUM TRAFFIC IN ETHERNET VIRTUAL PRIVATE NETWORK

(71) Applicant: Cisco Technology, Inc., San Jose, CA (US)

(72) Inventors: Ali Sajassi, Alamo, CA (US); Ramchander R Nadipally, Milpitas, CA (US); Neeraj Malhotra, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 18/490,127

(22) Filed: Oct. 19, 2023

(65) Prior Publication Data

US 2024/0356838 A1 Oct. 24, 2024

Related U.S. Application Data

(60) Provisional application No. 63/496,974, filed on Apr. 19, 2023.

(51) Int. Cl.
*H04L 45/00* (2022.01)
*H04L 45/02* (2022.01)
*H04L 45/76* (2022.01)

(52) U.S. Cl.
CPC .............. *H04L 45/32* (2013.01); *H04L 45/02* (2013.01); *H04L 45/76* (2022.05)

(58) Field of Classification Search
None
See application file for complete search history.

(56) References Cited

U.S. PATENT DOCUMENTS

| | | | | |
|---|---|---|---|---|
| 10,142,129 | B1 | 11/2018 | Gupta et al. | |
| 10,887,234 | B1 * | 1/2021 | Singh | H04L 45/14 |
| 11,076,025 | B1 * | 7/2021 | Volpe | H04L 43/106 |
| 2017/0054646 | A1 * | 2/2017 | Kitada | H04L 47/215 |
| 2017/0310598 | A1 | 10/2017 | Boutros et al. | |
| 2018/0219799 | A1 * | 8/2018 | Doi | H04L 12/1877 |
| 2020/0287826 | A1 | 9/2020 | Wang et al. | |
| 2021/0160350 | A1 * | 5/2021 | Volpe | H04L 67/563 |
| 2021/0337008 | A1 * | 10/2021 | Thomas, III | H04L 63/029 |
| 2022/0224684 | A1 * | 7/2022 | Schultz | H04W 76/11 |
| 2022/0311643 | A1 | 9/2022 | Chundu et al. | |
| 2023/0073266 | A1 | 3/2023 | Boutros et al. | |
| 2024/0283732 | A1 * | 8/2024 | Shashidhar | H04L 45/66 |

* cited by examiner

*Primary Examiner* — Jeffrey R Swearingen
(74) *Attorney, Agent, or Firm* — Polsinelli P.C.

(57) ABSTRACT

In one aspect, a method includes receiving, at a first PE in a network of EVPNs, one or more of information on status of one or more nodes connected to the first PE, the one or more nodes being one of a leaf node or a root node; and a respective advertisement message from one or more second PEs. The method further includes performing one or more of generating, based on the information, a route advertisement message indicative of the status of the one or more nodes connected to the first PE, wherein the route advertisement message is shared with one or more second PEs; and based on the respective advertisement message received from each of the one or more second PEs, dynamically adjust configurations at the first PE, to perform ingress filtering or egress filtering of Broadcast, Unknown Unicast, and Multicast (BUM) traffic received at the first PE.

20 Claims, 6 Drawing Sheets

ADAPTIVE FILTERING OF BUM TRAFFIC IN ETHERNET VIRTUAL PRIVATE NETWORK

CROSS-REFERENCE TO RELATED APPLICATIONS

This application claims priority to U.S. Provisional Application No. 63/496,974 filed on Mar. 19, 2023, the entire content of which is incorporated herein by reference.

BACKGROUND

Ethernet Virtual Private Tree (E-TREE), or rooted point-to-multipoint Ethernet Virtual Connection (EVC), is a Layer 2 service defined by the Metro-Ethernet Forum (MEF) that provides an Ethernet virtual local area network (VLAN) configuration suitable for multicast services. Illustratively, the Internet Engineering Task Force (IETF) Internet Draft entitled "Requirements for MEF E-Tree Support in VPLS"<draft-ietf-l2vpn-etree-reqt> by Key et al. specifies the requirements for supporting MEF E-TREE service in layer-2 virtual private network (L2VPN). Other types of EVCs defined for Carrier Ethernet networking are the E-Line and E-LAN.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
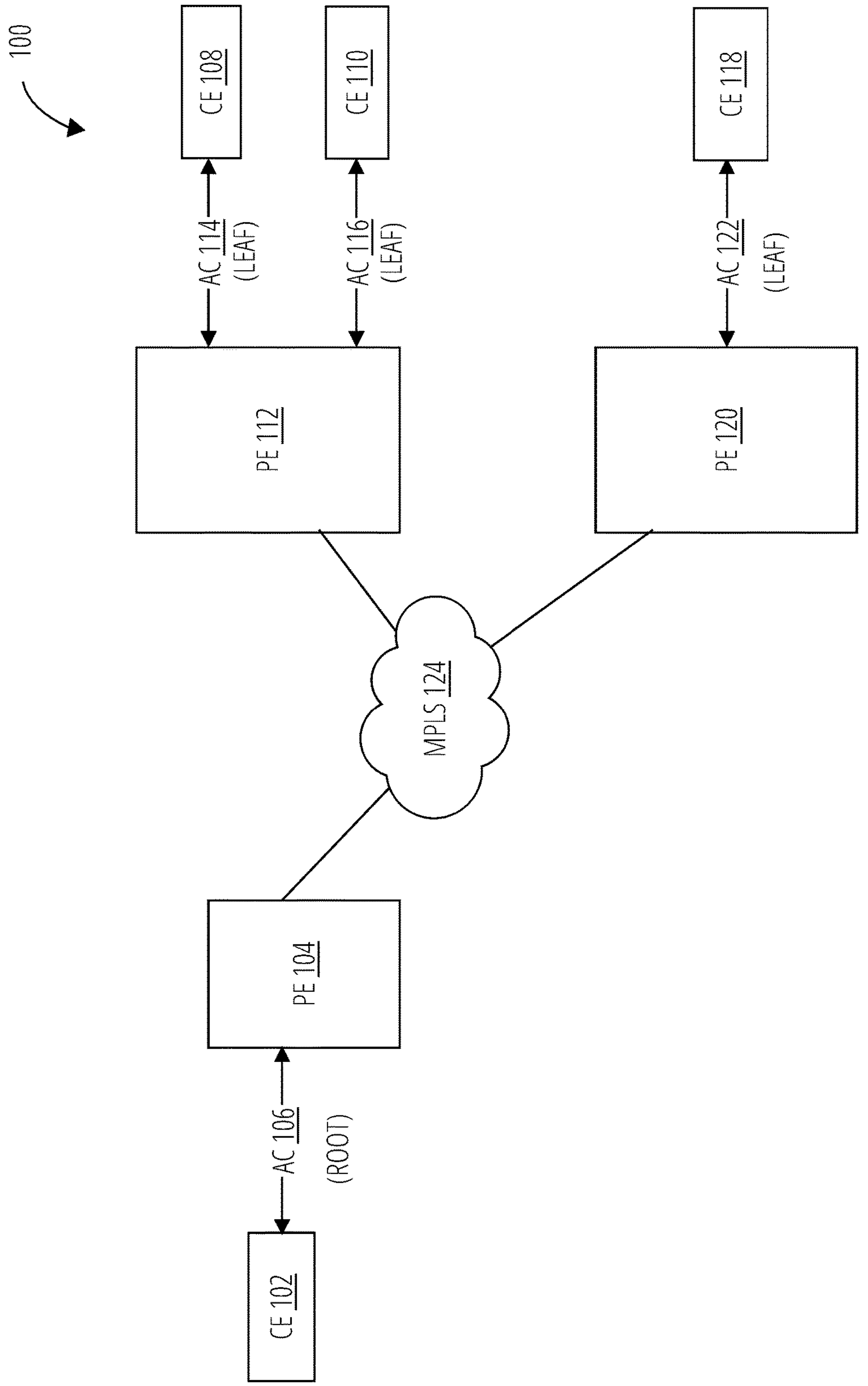
FIG. 1 is a schematic block diagram of an example inter-connected network of EVPNs, according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

One or more aspects of the present disclosure are directed to dynamic ingress and egress filtering of Broadcast, Unknown Unicast, and Multicast (BUM) traffic in an inter-connected network of Ethernet Virtual Private Networks (EVPN). Each EVPN in this inter-connected network may have a Provider Edge (PE) that can dynamically determine whether to perform ingress filtering, at the PE, of network traffic received at the PE from one or more end terminals (nodes) connected to the PE or to forward the network traffic for egress filtering at another PE associated with an end terminal (node) to which the network traffic is destined. The decision as to whether a PE is to perform ingress filtering or should forward traffic to other PEs for egress filtering can dynamically change depending on the status of nodes connected to each PE (i.e., root node or leaf node). As will be described below, effective implementation of this dynamic filtering is premised on (1) each PE accurately advertising routes (e.g., Inclusive Multicast Ethernet Tag (IMET) routes) associated therewith; and (2) route advertisements received from other PEs in the network.

In one aspect, a method includes receiving, at a first Provider Edge (PE) of a first Ethernet Virtual Private Network (EVPN) in an inter-connected network of EVPNs, one or more of information on status of one or more nodes connected to the first PE, the one or more nodes being one of a leaf node or a root node; and a respective advertisement message from one or more second PEs of one or more second EVPNs in the inter-connected network of EVPNs. The method further includes performing, at the first PE, one or more of: generating, based on the information, a route advertisement message indicative of the status of the one or more nodes connected to the first PE, wherein the route advertisement message is shared with one or more second PEs; and based on the respective advertisement message received from each of the one or more second PEs, dynamically adjust configurations at the first PE, to perform ingress filtering or egress filtering of Broadcast, Unknown Unicast, and Multicast (BUM) traffic received at the first PE.

In another aspect, the method further includes generating a first flood list, the first flood list encompassing all PEs in the inter-connected network of EVPNs; and generating a second flood list, the second flood list excluding any of the one or more second PEs with only a leaf indication included in the respective advertisement message received therefrom.

In another aspect, the method further includes receiving the BUM traffic, at the first PE, from the leaf node attached to the first PE; and performing ingress filtering of the BUM traffic received at first PE from the leaf node to prevent the BUM traffic from being sent to the any of the one or more second PEs with only the leaf indication.

In another aspect, the ingress filtering includes sending the BUM traffic to all PEs included in the second flood list.

In another aspect, the BUM traffic is sent to all PEs in the second flood list with a leaf VxLAN Network Identifier (VNI) identifying the BUM traffic as being from a leaf node, the leaf VNI enabling a receiving PE from among the one or more second PEs to perform egress filtering prior to sending the BUM traffic to a leaf node associated with the receiving PE.

In another aspect, the method further includes receiving the BUM traffic, at the first PE, from one of the one or more second PEs; and determining whether to perform egress filtering of the BUM traffic based on a VxLAN Network Identifier (VNI) associated with the BUM traffic.

In another aspect, the first PE performs egress filtering of the BUM traffic if the VNI associated with the BUM traffic identifies the BUM traffic as originating from a leaf node attached to the one of the one or more second PEs from which the BUM traffic is received, and one of the one or more nodes is the leaf node.

In one aspect, an inter-connected network of Ethernet Virtual Private Networks (EVPNs) includes a plurality of Provider Edges (PEs) including a first PE and one or more second PEs. The first PE is configured to receive one or more of information on status of one or more nodes connected to the first PE, the one or more nodes being one of a leaf node or a root node; and a respective advertisement message from the one or more second PEs. The first PE is further configured to perform one or more of generating, based on the information, a route advertisement message indicative of the status of the one or more nodes connected to the first PE, wherein the route advertisement message is shared with one or more second PEs; and based on the respective advertisement message received from each of the one or more second PEs, dynamically adjust configurations at the first PE, to perform ingress filtering or egress filtering of Broadcast, Unknown Unicast, and Multicast (BUM) traffic received at the first PE.

In one aspect, one or more non-transitory computer-readable media include computer-readable instructions, which when executed by one or more processors at a first Provider Edge (PE) of an inter-connected network of Ethernet Virtual Private Networks (EVPNs), cause the first PE to receive one or more of information on status of one or more nodes connected to the first PE, the one or more nodes being one of a leaf node or a root node; and a respective advertisement message from one or more second PEs of one or more second EVPNs in the inter-connected network of EVPNs; and perform one or more of: generating, based on the information, a route advertisement message indicative of the status of the one or more nodes connected to the first PE, wherein the route advertisement message is shared with one or more second PEs; and based on the respective advertisement message received from each of the one or more second PEs, dynamically adjust configurations at the first PE, to perform ingress filtering or egress filtering of Broadcast, Unknown Unicast, and Multicast (BUM) traffic received at the first PE.

Example Embodiments

As noted above, Ethernet Virtual Private Tree (E-TREE), or rooted point-to-multipoint Ethernet Virtual Connection (EVC), is a Layer 2 service defined by the Metro-Ethernet Forum (MEF) that provides an Ethernet virtual local area network (VLAN) configuration suitable for multicast services. Illustratively, the Internet Engineering Task Force (IETF) Internet Draft entitled "Requirements for MEF E-Tree Support in VPLS"<draft-ietf-l2vpn-etree-reqt> by Key et al. specifies the requirements for supporting MEF E-TREE service in layer-2 virtual private network (L2VPN). Other types of EVCs defined for Carrier Ethernet networking are the E-Line and E-LAN.

The sites in an E-TREE service have constrained connectivity, and are designated as being Root and/or Leaf. The service is set up such that:

- Root sites can communicate with all other sites (Root or Leaf).
- Leaf sites can communicate with Root sites, but not with other Leaf sites.

Current solutions for addressing E-TREE in L2VPN (whether for virtual private LAN service (VPLS), Virtual Private Multicast Service (VPMS) or Ethernet Virtual Private Network (EVPN)) rely on an egress-filtering model. This means that the egress (i.e., disposition) PE device (e.g., the PE to which a destination for network traffic is attached) decides on whether to forward or drop traffic destined to a local attachment circuit, to satisfy the E-TREE connectivity constraints. This model unnecessarily wastes the bandwidth of the Multi-Protocol Label Switching (MPLS) network, where leaf-to-leaf traffic, all known unicast traffic, and ingress-replicated multi-destination traffic (broadcast, unicast unknown, and multicast (BUM) traffic), is transported over the MPLS network only to be dropped on the egress PE.

As will be described below, the present disclosure provides a dynamic ingress and egress filtering for BUM traffic that addresses the shortcomings of existing solutions.

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

In an E-Tree service, a customer site that is typically represented by an Attachment Circuit (AC) (e.g., an 802.1Q VLAN tag), is labeled as either a Root or a Leaf site. The terms site and node may be used interchangeably throughout this disclosure. A customer site may also be represented by a Media Access Control (MAC) address along with a VLAN tag. Root sites can communicate with all other customer sites (both Root and Leaf sites). However, Leaf sites can communicate with Root sites but not with other Leaf sites. Throughout this disclosure, a site is represented by an AC. Furthermore, an EVPN network is represented by one or more Customer Edge (CE) devices connected to a Provider Edge (PE) via one or more ACs.

FIG. 1 is a schematic block diagram of an example inter-connected network of EVPNs, according to some aspects of the present disclosure. As shown, network 100 is an inter-connected network of EVPNs illustratively including nodes/devices, such as a plurality of routers/devices interconnected by links or networks, as shown. Links over which communications may occur may utilize predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. Those skilled in the art will also understand that while the embodiments described herein are described generally for inter-AS operation, the present disclosure may apply to any similar inter-domain network configuration where similar techniques would be suitable.

In non-limiting example of FIG. 1, network 100 is formed of three example EVPNs interconnected via Multi-Protocol Label Switching Network (MPLS) such as MPLS 124. A first of three example EVPNs is formed of CE 102, PE 104 and AC 106, which in this example is a root AC, representing a root site. A second of the three example EVPNs is formed of CE 108, CE 110, PE 112, AC 114 via which CE 108 is connected to PE 112, and AC 116 via which CE 110 is connected to PE 112. In this example, both AC 114 AC 116 are leaf ACs representing leaf sites. A third of the three example EVPNs is formed of CE 118, PE 112, AC 122 via which CE 118 is connected to PE 120. In this example, AC 122 via which CE 118 is connected to PE 120 represents a leaf site.

In example of FIG. 1, a PE (e.g., one of PEs 104, 112, and 120) may receive traffic from either Root ACs or Leaf ACs for a given Broadcast Domain (BD) (i.e., EVI or EVI+VLAN) but not both. A PE may have one or more BDs associated with it. In other words, a given BD on a Provider Edge (PE) device is either associated with Root(s) or Leaf(s). The PE may have both Root and Leaf ACs, albeit for different BDs.

In this scenario, there may be no EVPN data-plane communications among leaf PEs belonging to the same BD. However, EVPN control-plane communications among these PEs may occur because of host mobility (i.e., a host can move from one leaf PE to another leaf PE in the same BD). Therefore, EVPN unicast MAC/IP routes need to be exchanged among the leaf PEs to allow for EVPN MAC mobility procedures to get executed properly. This implies a single Route Target just like baseline EVPN per EVI must be used for this scenario.

Furthermore, in this scenario, known unicast traffic from a leaf PE destined to another leaf PE is dropped at the ingress PE (i.e., known unicast traffic from a leaf PE is only allowed to a root PE). For instance, traffic from CE 118 to CE 108 will be subject to ingress filtering and is dropped at PE 120. This ingress filtering of known unicast traffic is achieved by signaling extensions to EVPN for coloring EVPN MAC/IP routes. For scenario of FIG. 1, wherein each PE is associated with either leaf or root site(s) but not both, this ingress filtering of unknown unicast traffic may be extended similarly to BUM traffic in case of ingress replication. This ingress filtering of BUM traffic can be accomplished by coloring IMET routes with either tailored BGP route import/export policies or EVPN signaling extensions.

When BGP route policies are used to enable ingress filtering of BUM traffic in case of ingress replication (for the BDs that need this policy), the transmit policy matches on EVPN IMET route and colors the IMET route with a BGP standard community attribute, as known, and the receiver PE checks IMET routes with such color and discards them.

However, when E-Tree topology is dynamic in nature and can vary between, for example, the example scenario of FIG. 1 and that described below with reference to FIG. 2, then EVPN signaling extensions of the present disclosure may be used. VPN signaling extensions to enable ingress filtering for BUM traffic in case of ingress replication, as well as dynamic switch between ingress and egress filtering of BUM traffic in case of ingress replication will be described below with reference to FIGS. 3 and 4.

Figure 2:
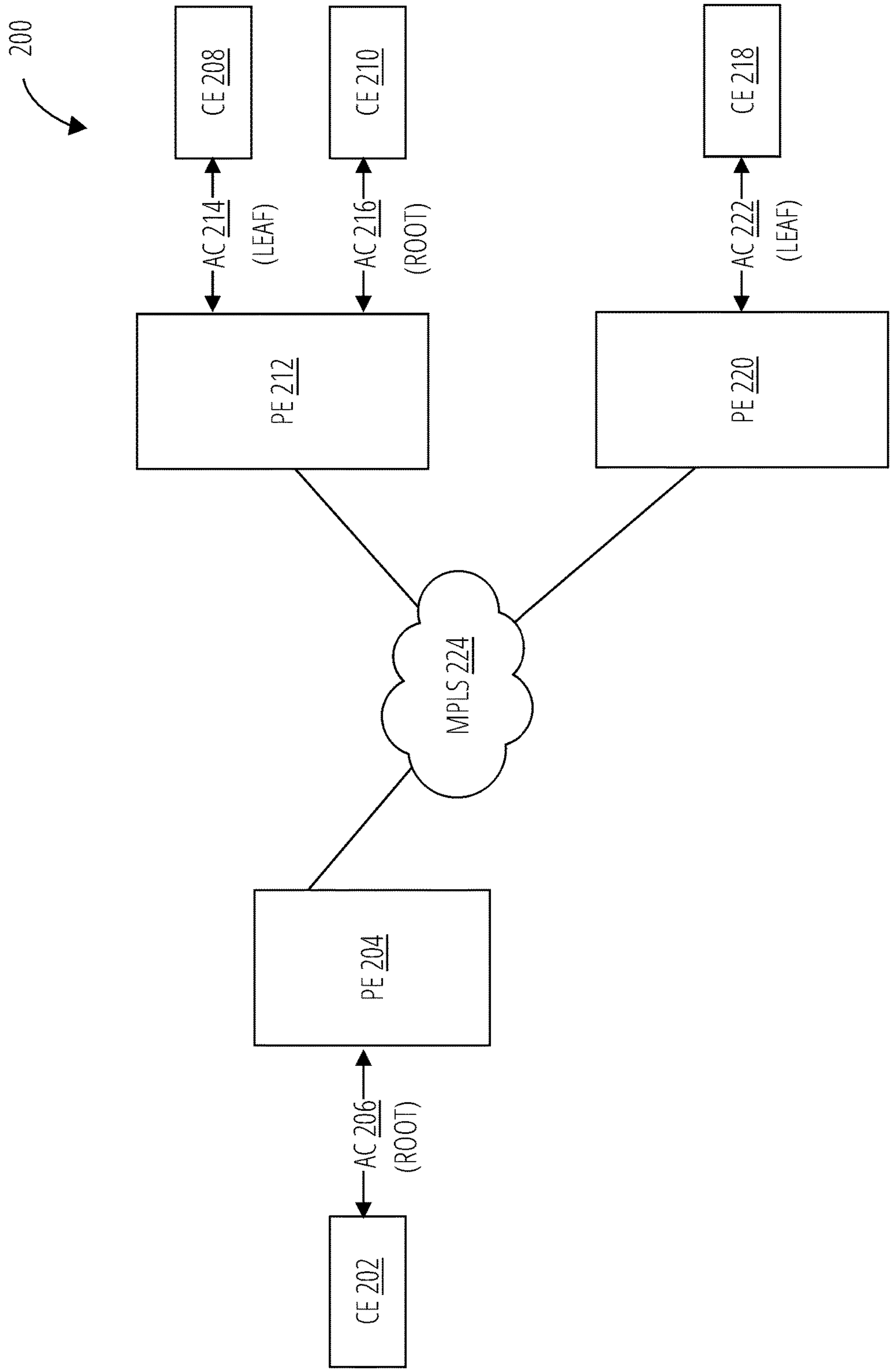
FIG. 2 is a schematic block diagram of an example inter-connected network of EVPNs, according to some aspects of the present disclosure.

FIG. 2 is a schematic block diagram of an example inter-connected network of EVPNs, according to some aspects of the present disclosure. As shown, network 200 is an inter-connected network of EVPNs illustratively including nodes/devices, such as a plurality of routers/devices interconnected by links or networks, as shown. Links over which communications may occur may utilize predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. Those skilled in the art will also understand that while the embodiments described herein are described generally for inter-AS operation, the present disclosure may apply to any similar inter-domain network configuration where similar techniques would be suitable.

In non-limiting example of FIG. 2, network 200 is formed of three example EVPNs interconnected via Multi-Protocol Label Switching Network (MPLS) such as MPLS 224. A first of three example EVPNs is formed of CE 202, PE 204 and AC 206, which in this example is a root AC, representing a root site. A second of the three example EVPNs is formed of CE 208, CE 210, PE 212, AC 214 via which CE 208 is connected to PE 212, and AC 216 via which CE 210 is connected to PE 212. In this example, AC 214 is a leaf AC representing a leaf site while AC 216 is a root AC representing a root site. A third of the three example EVPNs is formed of CE 218, PE 220, and AC 222 via which CE 218 is connected to PE 220. In this example, AC 222 via which CE 218 is connected to PE 220 represents a leaf site.

In example of FIG. 2 and in comparison, with FIG. 1, a PE (e.g., PE 212) can have a BD with both root and leaf ACs. Unlike the scenario of FIG. 1, ingress filtering of known unicast traffic cannot be extended to BUM traffic because a participant PE (e.g., PE 212) can have both leaf and root ACs and thus need to receive the BUM traffic and perform egress filtering.

In order to perform egress filtering for BUM traffic received at the egress PE (e.g., PE 212), the ingress PE (e.g., PE 220) needs to color the BUM traffic in data plane to indicate if the traffic is coming from a Root or a Leaf. The egress PE uses this indication in data plane to make a decision as to whether to perform egress filtering of the received BUM traffic or not.

In this scenario, the transmission of BUM traffic to an egress PE (in a given BD) that is only configured with leaf ACs, can be optimized by performing ingress filtering of BUM traffic prior to transmitting the BUM traffic to the egress PE. However, because of the dynamic nature of AC leaf/root activation on a PE, EVPN signaling extensions may be needed. These extensions are described below with reference to FIGS. 3 and 4. As will be described below, this adaptive ingress filtering optimization for BUM traffic is applicable to ingress replication tunnels. For a P2MP tunnel sourced from a leaf PE, other leaf PEs in the same BD should avoid joining that tree. This will be further described below.

It should be noted that networks 100 and 200 of FIGS. 1 and 2 are non-limiting examples of an E-tree structure. Each of networks 100 and 200 may include more or less EVPNs with each EVPN have more or less CEs connected thereto. Each AC can be representative of a root site, a leaf site, and/or a combined root and leaf site.

It was noted previously that filtering of BUM traffic can be optimized by performing ingress filtering of BUM traffic from at PE of a leaf AC to other PEs with leaf only ACs in case of ingress replication. Furthermore, it was noted that a PE role, for a given BD, as a leaf-only, root-only, or both leaf-and-root can change dynamically as new ACs can be added or existing ACs can be modified or deleted. This optimization may be performed dynamically via EVPN signaling extensions and without any operator manual intervention, as will be described below.

EVPN signaling extensions that can enable dynamic ingress and egress filtering of BUM traffic with ingress duplication may be two folded. In other words, the signaling extensions include each PE properly advertising the state of ACs (e.g., leaf, root, and/or both) connected thereto (i.e., each PE acting as an advertising PE) and each PE receiving the advertising of the state of ACs associated with other PEs and appropriately updating its record (i.e., each PE acting as a receiving PE). Furthermore, signaling extensions may occur over the control plane.

Figure 3:
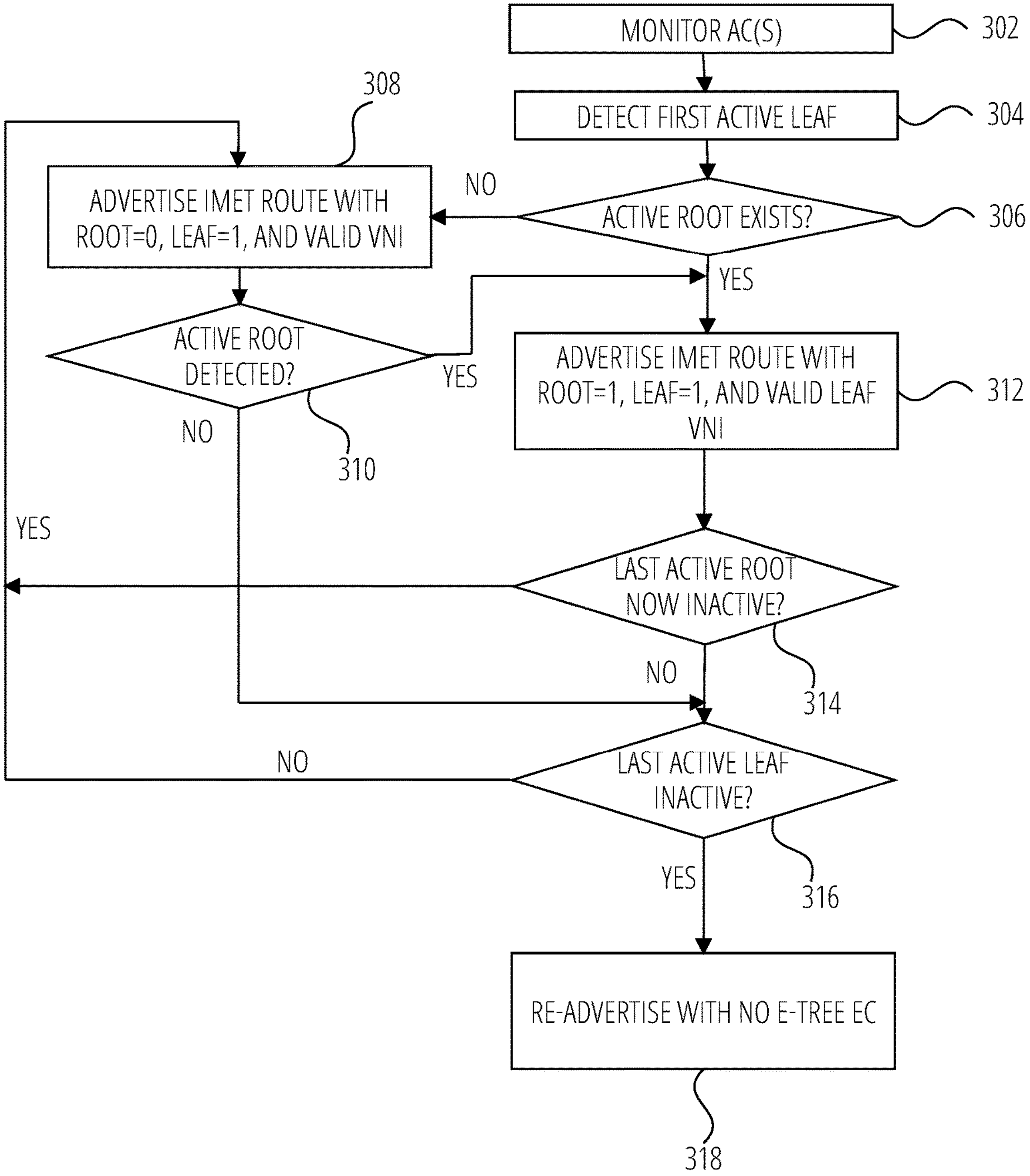
FIG. 3 illustrates a signaling procedure for an advertising PE according to some aspects of the present disclosure.

FIG. 3 illustrates a signaling procedure for an advertising PE according to some aspects of the present disclosure. As will be described in detail below, FIG. 3 illustrates control plane procedure for a PE advertising EVPN IMET route used for BUM traffic. The IMET route is specified in the standards and carries Provider Multicast Service Interface (PMSI) Tunnel attribute for identifying tunnel type (i.e., Ingress Replication, Protocol Independent Multicast-Sparse Mode (PIM-SM) Point-to-Multipoint (P2MP), Multicast Label Distribution Protocol (mLDP) P2MP, etc.). The IMET route also carries Tunnel Encapsulation Extended Community (EC) as specified in Internet Engineering Task Force (IETF) [RFC9012], which identifies encapsulation type over multicast tunnel (i.e., Virtual Extended Local Area Network (VxLAN), Network Virtualization using Generic Routing Encapsulation (NVGRE), Generic Network Virtualization Encapsulation (GENEVE), MPLS, etc.). In case of non-MPLS overlay encapsulation (e.g., VxLAN, GENEVE) with domain-wide VxLAN Network Identifier (VNI), the advertising PE is also the ingress PE for BUM traffic. However, in case of non-MPLS overlay encapsulation with locally-assigned VNI or MPLS overlay encapsulation with local MPLS label, the advertising PE is the ingress PE for P2MP tunnel type and it is the egress PE for Ingress Replication tunnel type. In addition to PMSI Tunnel Attribute and Tunnel Encapsulation EC, the IMET route may be advertised with E-Tree EC in order to support adaptive ingress and egress filtering as highlighted below. Hereinafter, signaling procedure for an advertising PE is described. This procedure will be described from the perspective of a receiving PE such as PE 120. However, any of PEs of FIG. 1 and FIG. 2 can be a receiving PE and hence may implement the below-described control plane signaling procedures.

At block 302, PE 120 may monitor AC(s) attached (connected) thereto. In example of FIG. 1, PE 120 may monitor AC 122.

At block 304, PE 120 may determine (detect) an active leaf AC that is attached to PE 120. In example of FIG. 1, PE 120 detects that AC 122, which is a leaf AC, is active.

At block 306, PE 120 determines if an active root AC is also attached thereto. In example of FIG. 1, no active AC root is attached to PE 120. However, in example of FIG. 2, active root AC 216 is attached to PE 212.

If at block 306, PE 120 determines that no active root is attached to PE 120 (NO at block 306), then at block 308, PE 120 generates and advertises an IMET route for PE 120. This advertisement can include an indication that no active root AC is attached to PE 120, that there is an active leaf AC attached to PE 120, along with a valid VNI for the active leaf AC (e.g., root tag=0, leaf tag=1; leaf VNI=ABC).

If at block 306, PE 120 determines that an active root AC is attached to PE 120 (YES at block 306), then at block 312, PE 120 generates and advertises an IMET route for PE 120. This advertisement can include an indication that an active root AC is attached to PE 120, that there is an active leaf AC attached to PE 120, along with a valid leaf VNI for the active leaf AC (e.g., root tag=1, leaf tag=1; leaf VNI=EFG).

After PE 120 advertises the IMET route at block 308, at block 310, PE 120 determines if an active root is detected subsequent to the detection at block 306. In one example, process of block 310 may be merged into block 306.

If an active root is detected at block 310 (YES at block 310), the process proceeds to block 312, as described above. However, if an active root is not detected at block 310 (NO at block 310), the process proceeds to block 316, which will be described below.

Referring back to block 312 and after advertising the IMET route at block 312, PE 120 may proceed to block 312. At this point, PE 120 may have one or more leaf ACs and one or more root ACs attached thereto. At block 314, PE 120 determines whether a last one of active root ACs has become inactive. If PE 120 determines that the last one of active root ACs has become inactive (YES at block 314), the process reverts back to block 308 and PE 120 may repeat blocks 308 to 314.

However, if PE 120 determines that at least one active root remains attached to PE 120 (NO at block 314), at block 316, PE 120 determines if the last one of active leaf ACs is now inactive. If PE 120 determines that at least one active leaf AC remains (NO at block 316), the process reverts back to block 308 and PE 120 may repeat blocks 308 to 314.

However, if PE 120, at block 316, determines that the last active leaf AC is now inactive (YES at block 316), then at block 318, PE 120 re-advertises the IMET route with no E-tree ECs (e.g., E-TREE EC field is empty as shown in conditions 1 or 2 in Table-1 below).

Table 1 below outlines the different types of IMET route advertisements that each PE, as an advertising PE, may signal to other PEs over the control plane indicative of root and/or leaf AC(s) connected thereto:

TABLE 1

| Condition | Root AC | Leaf AC | E-Tree EC Fields |
|---|---|---|---|
| 1 | No | No | No E-Tree EC |
| 2 | Yes | No | No E-Tree EC |
| 3 | No | Yes | Root = 0;<br>Leaf = 1;<br>Leaf-VNI = Valid or<br>Leaf-VNI = 0xFFFFF |
| 4 | Yes | Yes | Root = 1;<br>Leaf = 1;<br>Leaf-VNI = Valid or<br>Leaf-VNI = 0xFFFFF |

As noted above, a PE may be an advertising PE (informing other PEs of the state of AC(s) connected thereto) or may be a receiving PE that can update its own ingress/egress filtering of BUM traffic based on the route advertisements received from other PEs and the state of ACs connected thereto. Hereinafter, signaling procedure for a receiving PE is described.

Figure 4:
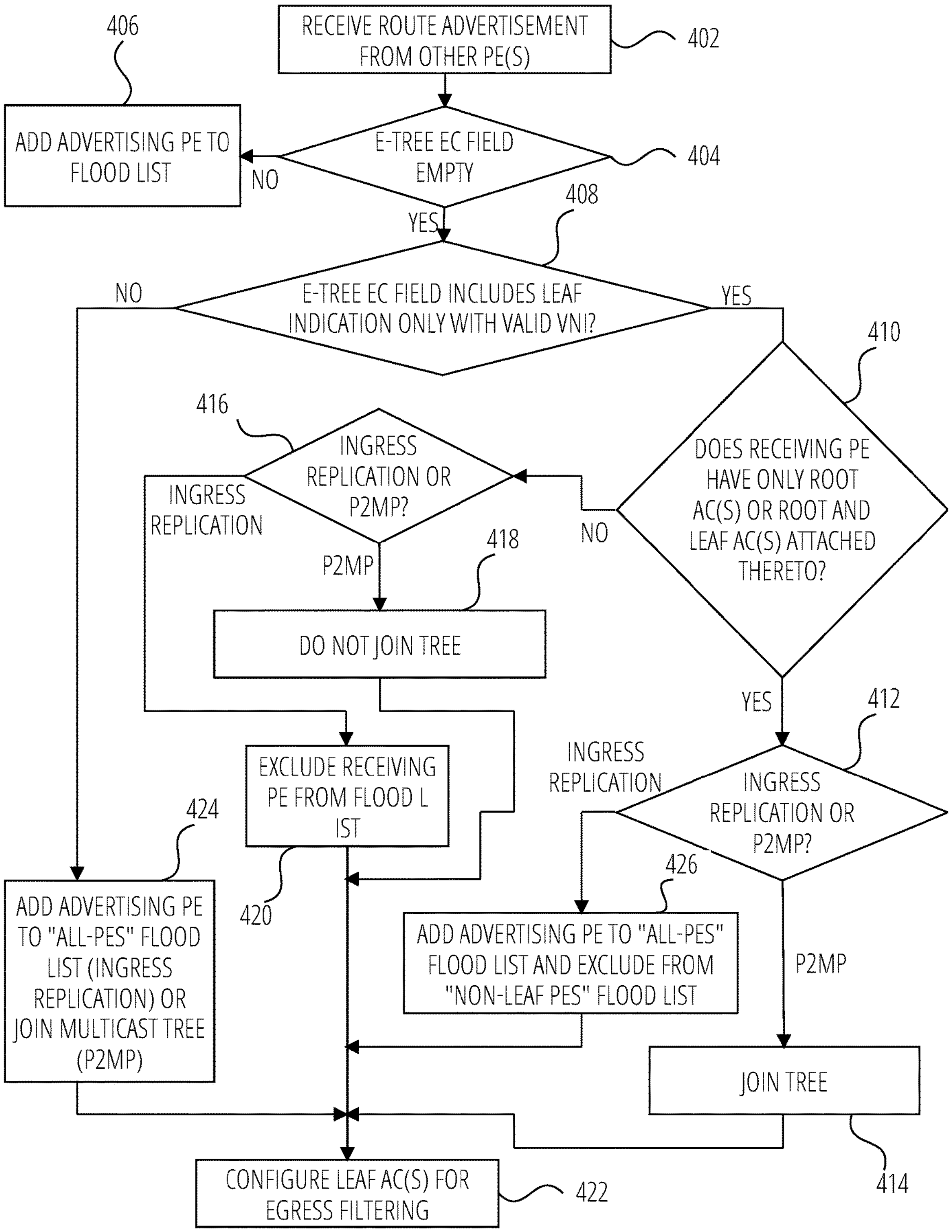
FIG. 4 illustrates a signaling procedure for a receiving PE according to some aspects of the present disclosure.

FIG. 4 illustrates a signaling procedure for a receiving PE according to some aspects of the present disclosure. This procedure will be described from the perspective of a receiving PE such as PE 112. However, any of PEs of FIG. 1 and FIG. 2 can be a receiving PE and hence may implement the below-described control plane signaling procedures.

At block 402, PE 112 receives at least one route advertisement from one or more advertising PEs. In one example, PE 112 may receive a route advertisement (IMET route advertisement) from each of PEs 104 and 120. In one example, each route advertisement may be received in the form of Table-1, as whole, or an individual entry thereof (e.g., any one or more of condition 1, condition 2, condition 3, and/or condition 4).

At block 404, PE 112 determines if an E-Tree EC field of the received route advertisement is empty (e.g., if the route advertisement corresponding to condition 1 and/or 2). If the E-Tree EC field is not empty (NO at block 404), then at block 406, PE 112 adds advertising PE from which the route advertisement is received to PE 112's flood list, per IETF [RFC7432] and/or IETF [RFC8365]. A route advertisement with an empty E-tree EC field is indicative of the advertising PE having only a root AC associated therewith, in which case no filtering of BUM traffic is to be performed as traffic routing from a root AC to another root AC or leaf AC is allowed, as described above.

However, if the E-tree EC field is empty (YES at block 404), then at block 408, PE 112 determines if the E-Tree EC includes leaf indication only with a valid VNI (e.g., route advertisement corresponding to condition 3 in Table-1) or not. If the E-tree EC includes leaf indication only (YES at block 406), at block 410, PE 112 determines whether PE 112 has only root AC(s) associated with PE 112 or both root and leaf AC(s). In non-limiting example of FIG. 1, PE 112 has leaf ACs (AC 114 and AC 116) associated with PE 112. However, in example of FIG. 2, PE 212 has both root and leaf ACs (AC 214 and AC 216) associated with PE 212.

If at block 410, PE 112 determines that PE 112 has only root or both root and leaf AC(s) associated with PE 112 (YES at block 410), then at block 412, PE 112 determines whether PE 112 is configured for ingress replication or P2MP tunnel. If configured for P2MP tunnel, then at block 414, PE 112 joins a tree for advertising PE from which route advertisement is received at block 402 (for the BD associated with the advertising PE). Thereafter, the process proceeds to block 422, which will be described below.

However, if PE 112 is configured for ingress replication, at block 426, PE 112 adds the advertising PE to an "All-PEs" flood list at PE 112 and excludes the advertising PE from a "non-leaf PEs" flood list at PE 112. Thereafter, the process proceeds to block 422, which will be described below.

Referring back to block 410, if PE 112 determines that PE 112 has only leaf AC(s) associated with PE 112 (does not have only root or both root and leaf AC(s) associated with PE 112) (NO at block 410), at block 416, PE 112 determines whether PE 112 is configured for ingress replication or P2MP tunnel. If configured for P2MP tunnel, then at block 418, PE 112 does not join a tree for advertising PE from which route advertisement is received at block 402 (for the BD associated with the advertising PE). Thereafter, the process proceeds to block 422, which will be described below.

However, if PE 112 is configured for ingress replication, at block 420, PE 112 excludes receiving PE from a flood list at PE 112. Thereafter, the process proceeds to block 422, which will be described below.

Referring back to block 408, if PE 112 determines that E-tree EC field does not include leaf only indication with valid VNI (NO at block 408), meaning E-tree EC field includes root only and/or root and leaf AC indications (e.g., condition 4 in Table-1), then at block 424, PE 112 adds advertising PE to "All-PEs" flood list at PE 112 when PE 112 is configured to ingress replication, or joins a multicast tree for advertising PE (for the BD associated with the advertising PE) if PE 112 is configured to P2MP tunnel.

At block 422, PE 112 configures leaf AC(s) associated with PE 112 for egress filtering of BUM traffic received from other PEs (e.g., PE 112 ensures that BUM traffic received from a leaf site associated with another PE is filtered and dropped before the BUM traffic reaches a leaf site associated with PE 112).

Accordingly, each PE in an inter-connected network of EVPNs can implement control plane signaling extensions as an advertising and receiving PE per processes of FIGS. 3 and 4. This extensions allow for dynamic ingress and egress filtering of BUM traffic on the data plane.

Table-2 summarizes dynamic ingress and egress filtering of BUM traffic at a given PE, over the data plane, using signaling extensions described above:

TABLE 2

| Condition | Ingress PE Role | Egress PE Role | Flood List |
|---|---|---|---|
| 1 | Root | Root | Use "All PEs" flood list with VNI for BUM traffic |
| 2 | Leaf | Leaf | Use "non-leaf PEs" flood list with Leaf VNI for BUM traffic |
| 3 | Root + Leaf | Root | Use "All PEs" flood list with Base VNI for BUM traffic |
| 4 | Root + Leaf | Leaf | Use "non-leaf PEs" flood list with Leaf VNI for BUM traffic |

With control plane signaling extensions set as described above, data plane filtering of BUM traffic may be performed as follows:

For ingress replication, BUM traffic coming from a leaf AC on a local PE (e.g., BUM traffic coming from AC 122 to local (ingress) PE 120, uses "non-leaf PEs" of PE 120. That is BUM traffic coming from AC 122 may be forwarded by PE 120 to PEs included in the "non-leaf PEs" flood list of PE 120, as shown in Table-2. On the other hand, for BUM traffic coming from a root AC at a local PE (e.g., BUM traffic coming AC 106 at local (ingress) PE 104) uses "All PEs" flood list of PE 104. That is BUM traffic coming from root AC 106 is not subject to ingress filtering at PE 104 and is forwarded to all other PEs to be subjected to egress filtering at a PE having a leaf AC associated therewith (according to option 1).

For P2MP and MP2MP tunnels, Leaf-only PEs, do not join the multicast tunnels from other Leaf PEs, Root-only or Root-and-Leaf PEs join the multicast tunnels from Leaf PEs, All PEs join the multicast tunnels from Root-only and Root-and-Leaf PEs.

For all multicast tunnels, an imposition PE (an ingress PE) uses leaf VNI for BUM traffic coming from a leaf AC on a local PE (e.g., BUM traffic coming from AC 122 on local (ingress) PE 120), per condition 2 in Table-2. An imposition PE uses base VNI for BUM traffic coming from a root AC on a local PE (e.g., BUM traffic coming AC 106 at local (ingress) PE 104), per condition 1 in Table-2.

On the other hand, a disposition PE (an egress PE), sends BUM traffic received with a leaf VNI only to root AC(s) associated with the disposition PE. For instance, PE 212, when receiving BUM traffic from PE 220 with a leaf VNI, performs egress filtering to drop the traffic and prevent the traffic from reaching leaf AC 214 but sends the BUM traffic to root AC 216.

Furthermore, a disposition PE (an egress PE), upon receiving BUM traffic with base VNI, sends the BUM traffic to both root and leaf AC(s) attached thereto. In other words, when a PE receives BUM traffic that is originated at a root site, the egress PE (similar to the ingress PE) need not perform any filtering and can simply forward the BUM traffic to all sites attached to the egress PE. For instance, BUM traffic received at PE 212 with base VNI from PE 204 (BUM traffic originating from root AC 206) is neither subject to ingress filtering at PE 204 nor is subject to egress filtering at PE 212. Hence, PE 212 simply forwards the BUM traffic to both root and leaf sites via AC 214 and AC 216.

In one example, an imposition PE, when sending BUM traffic, uses a leaf VNI if the traffic is sourced from a leaf site. If the BUM traffic is sourced from a root site, then existing base VNI is used. The leaf VNI identifies both the BD and the leaf role.

A disposition PE, when receiving a VxLAN or GENEVE encapsulated packet with leaf VNI, performs egress filtering accordingly (i.e., the disposition PE drops the packet at the egress leaf ACs and passes it at the egress root ACs).

Figure 5:
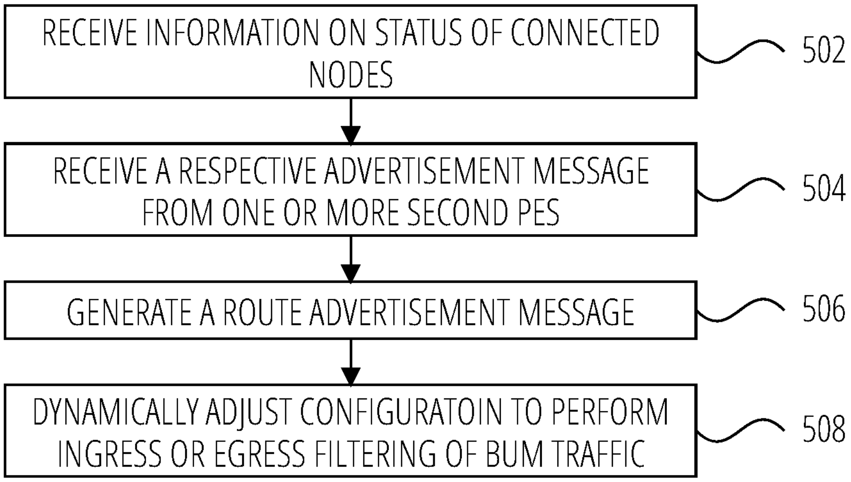
FIG. 5 illustrates a method for dynamic ingress and egress filtering of BUM traffic according to some aspects of the present disclosure.

FIG. 5 illustrates a method for dynamic ingress and egress filtering of BUM traffic according to some aspects of the present disclosure. FIG. 5 will be described from the perspective of a first PE, which can be any of the PEs described above with reference to FIGS. 1 and 2.

At block 502, the first PE may receive information on status of one or more nodes (e.g., AC(s)) connected to the first PE. In one example, status of a node can be an indication of whether node is a root node or a leaf node and also whether the leaf or root node is active or inactive, as described above with reference to FIG. 3.

At block 504, the first PE may further receive a respective advertisement message from one or more second PEs (other PEs in network 100 or 200 that may be advertising PEs from the perspective of the first PE). In one example, the respective advertisement message received from each of the one or more second PEs may be a respective IMET route advertisement generated by the respective of the one or more second PEs per the process of FIG. 4, as described above.

At block 506, the first PE may generate a route advertisement message indicative of the status of the one or more nodes connected to the first PE. The process of generating the route advertisement message (e.g., IMET route advertisement) may be performed as described above with reference to FIG. 3, non-limiting examples of which are provided in Table-1. In one example, the first PE shares (sends) the generated route advertisement message, to the one or more second PEs in the inter-connected network of EVPNs.

At block 508, the first PE may dynamically adjust configurations on the first PE to switch between ingress and egress filtering on BUM traffic received at the first PE. This dynamic adjust may be based on both the advertisement message(s) received from the one or more second PEs and the status of nodes (AC(s)) attached to the first PE.

In one example, using the advertisement messages received from the one or more second PEs, the first PE may generate a first flood list and a second flood list. Using these flood lists, the first PE may create a table to determine which flood list to use when receiving BUM network traffic either from nodes attached to the first PE or BUM traffic forwarded to the first PE by one or more of the second PEs. This table may be the same as table-2 described above.

Processes described above with reference to blocks 502, 504, 506, and 508 may be performed over the control plane. In other words, advertisement messages with updated information on status of nodes associated with each PE in the network may be shared among PEs over the control plane. However, the actual ingress and/or egress filtering of BUM traffic may be performed over the data plane.

As an example, the first PE may receive BUM traffic from a root node attached to the first PE. According to table-2, since the traffic is originating from a root node, the first flood list (encompassing all of the one or more second PEs) is used and the first PE forwards the BUM traffic to all other PEs in the network.

In another example, the first PE may receive BUM traffic from a leaf node attached to the first PE. Since the traffic is originating from a leaf node, the first PE performs ingress filtering by forwarding the BUM traffic to all PEs included in the second flood list. PEs in the second flood list exclude any PE that has only leaf nodes associated therewith.

In sending the BUM traffic to PEs included in the second flood list, the first PE may also include a leaf VNI with the BUM traffic that identifies the BUM traffic as originating from a leaf node. When second PE that has both root and leaf node(s) associated therewith, receives the BUM traffic and observes the leaf VNI, the second PE performs egress filtering by dropping the BUM traffic for the leaf node(s) associated with the second PE.

In another example, the first PE may receive BUM traffic from one of the second PEs. Such BUM traffic may be received at the first PE either because (1) the traffic originates from a root node at the second PE from which the BUM traffic is received, or (2) the first PE has both root and leaf node(s) associated therewith. In one example, the first PE determines that the BUM traffic has originated from a root node at the second PE, if the BUM traffic has a base VNI associated with it. However, if the BUM traffic has a leaf VNI associated with it (under (2)), then the first PE performs egress filtering of the BUM traffic in order to prevent the BUM traffic from reaching the leaf node attached to the first PE.

Figure 6:
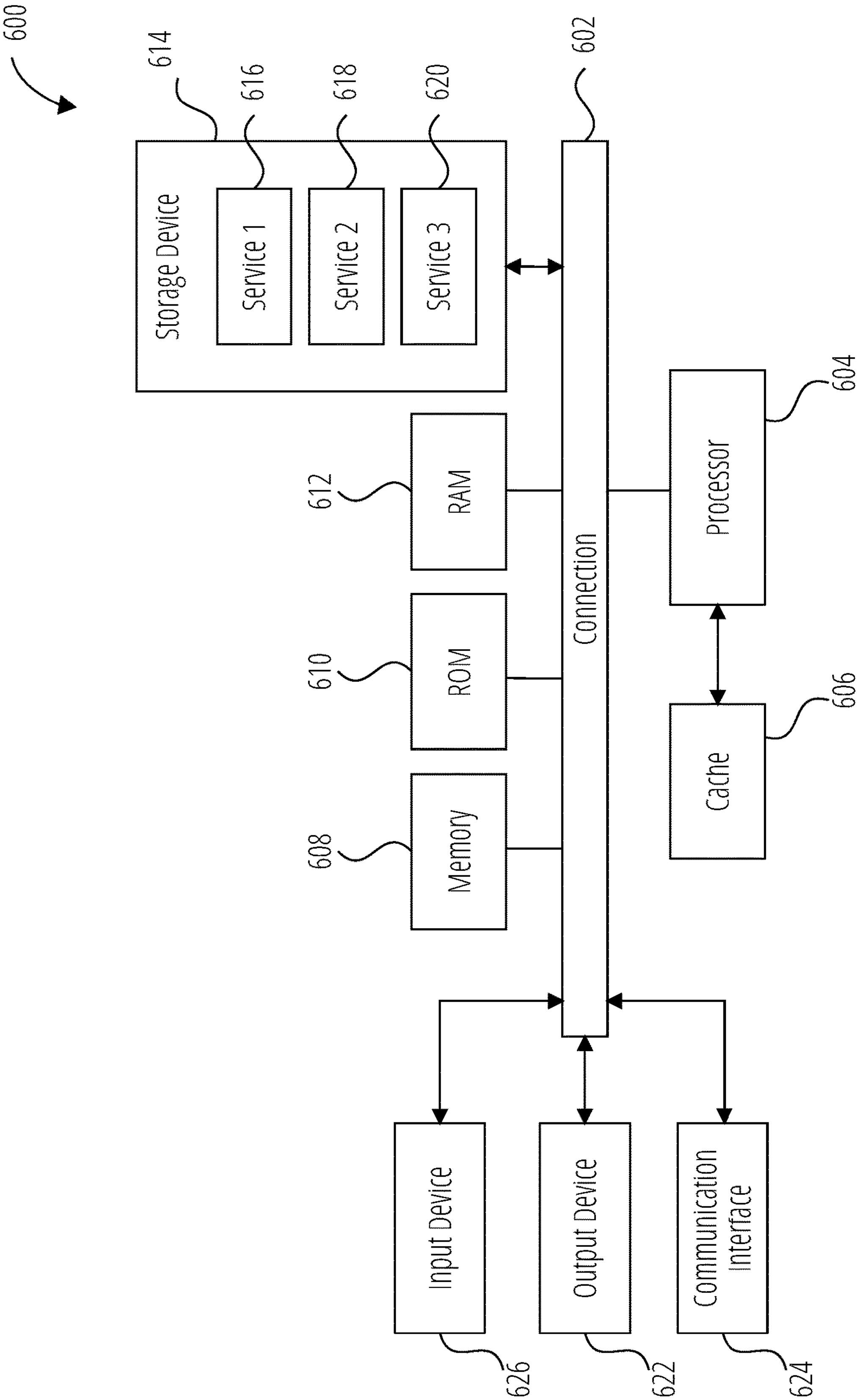
FIG. 6 shows an example computing system according to some aspects of the present disclosure.

FIG. 6 shows an example computing system according to some aspects of the present disclosure. Example computing system 600 can be for example any computing device making up components of network 100 and 200 of FIGS. 1 and 2 including, but not limited to, any of PEs and CEs shown in FIGS. 1 and 2, and described above. Components of computing system 600 may be in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, read-only memory (ROM) 610, and/or random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting “at least one of” a set and/or “one or more” of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C. or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:

receiving, at a first Provider Edge (PE) of a first Ethernet Virtual Private Network (EVPN) in an inter-connected network of EVPNs:

information on status of one or more nodes connected to the first PE, the one or more nodes being one of a leaf node or a root node, the status indicating whether each of the one or more nodes is one of a leaf node or a root node and whether the node is active or inactive; and a respective advertisement message from one or more second PEs of one or more second EVPNs in the inter-connected network of EVPNs; and performing, at the first PE:

generating, based on the information, a route advertisement message indicative of the status of the one or more nodes connected to the first PE, wherein the route advertisement message is shared with one or more second PEs; and based on the respective advertisement message received from each of the one or more second PEs and the status of the one or more nodes connected to the first PE, dynamically adjusting configurations at the first PE, to switch between ingress filtering and egress filtering of Broadcast, Unknown Unicast, and Multicast (BUM) traffic received at the first PE.

2. The method of claim 1, further comprising:

generating a first flood list, the first flood list encompassing all PEs in the inter-connected network of EVPNs; and generating a second flood list, the second flood list excluding any of the one or more second PEs with only a leaf indication included in the respective advertisement message received therefrom.

3. The method of claim 2, further comprising:

receiving the BUM traffic, at the first PE, from the leaf node attached to the first PE; and performing ingress filtering of the BUM traffic received at first PE from the leaf node to prevent the BUM traffic from being sent to the any of the one or more second PEs with only the leaf indication.

4. The method of claim 3, wherein the ingress filtering includes sending the BUM traffic to all PEs included in the second flood list.

5. The method of claim 4, wherein the BUM traffic is sent to all PEs in the second flood list with a leaf VxLAN Network Identifier (VNI) identifying the BUM traffic as being from a leaf node, the leaf VNI enabling a receiving PE from among the one or more second PEs to perform egress filtering prior to sending the BUM traffic to a leaf node associated with the receiving PE.

6. The method of claim 2, further comprising:

receiving the BUM traffic, at the first PE, from one of the one or more second PEs; and determining whether to perform egress filtering of the BUM traffic based on a VxLAN Network Identifier (VNI) associated with the BUM traffic.

7. The method of claim 6, wherein the first PE performs egress filtering of the BUM traffic if the VNI associated with the BUM traffic identifies the BUM traffic as originating from a leaf node attached to the one of the one or more second PEs from which the BUM traffic is received, and one of the one or more nodes is the leaf node.

8. An inter-connected network of Ethernet Virtual Private Networks (EVPNs), comprising:

a plurality of Provider Edges (PEs) including a first PE and one or more second PEs, wherein the first PE is configured to:

receive information on status of one or more nodes connected to the first PE, the one or more nodes being one of a leaf node or a root node, the status indicating whether each of the one or more nodes is one of a leaf node or a root node and whether the node is active or inactive;

receive a respective advertisement message from the one or more second PEs;

generate, based on the information, a route advertisement message indicative of the status of the one or more nodes connected to the first PE, wherein the route advertisement message is shared with one or more second PEs; and based on the respective advertisement message received from each of the one or more second PEs and the status of the one or more nodes connected to the first PE, dynamically adjust configurations at the first PE, to switch between ingress filtering and egress filtering of Broadcast, Unknown Unicast, and Multicast (BUM) traffic received at the first PE.

9. The inter-connected network EVPNs of claim 8, wherein the first PE is further configured to:

generate a first flood list, the first flood list encompassing all PEs in the inter-connected network of EVPNs; and generate a second flood list, the second flood list excluding any of the one or more second PEs with only a leaf indication included in the respective advertisement message received therefrom.

10. The inter-connected network of EVPNs of claim 9, wherein the first PE is further configured to:

receive the BUM traffic, at the first PE, from the leaf node attached to the first PE; and perform ingress filtering of the BUM traffic received at first PE from the leaf node to prevent the BUM traffic from being sent to the any of the one or more second PEs with only the leaf indication.

11. The inter-connected network EVPNs of claim 10, wherein the ingress filtering includes sending the BUM traffic to all PEs included in the second flood list.

12. The inter-connected network EVPNs of claim 11, wherein the BUM traffic is sent to all PEs in the second flood list with a leaf VxLAN Network Identifier (VNI) identifying the BUM traffic as being from a leaf node, the leaf VNI enabling a receiving PE from among the one or more second PEs to perform egress filtering prior to sending the BUM traffic to a leaf node associated with the receiving PE.

13. The inter-connected network EVPNs of claim 9, wherein the first PE is further configured to:

receive the BUM traffic, at the first PE, from one of the one or more second PEs; and determine whether to perform egress filtering of the BUM traffic based on a VxLAN Network Identifier (VNI) associated with the BUM traffic.

14. The inter-connected network EVPNs of claim 13, wherein the first PE performs egress filtering of the BUM traffic if the VNI associated with the BUM traffic identifies the BUM traffic as originating from a leaf node attached to the one of the one or more second PEs from which the BUM traffic is received, and one of the one or more nodes is the leaf node.

15. One or more non-transitory computer-readable media comprising computer-readable instructions, which when executed by one or more processors at a first Provider Edge (PE) of an inter-connected network of Ethernet Virtual Private Networks (EVPNs), cause the first PE to:

receive information on status of one or more nodes connected to the first PE, the one or more nodes being one of a leaf node or a root node, the status indicating whether each of the one or more nodes is one of a leaf node or a root node and whether the node is active or inactive;

receive a respective advertisement message from one or more second PEs of one or more second EVPNs in the inter-connected network of EVPNs;

generate, based on the information, a route advertisement message indicative of the status of the one or more nodes connected to the first PE, wherein the route advertisement message is shared with one or more second PEs; and based on the respective advertisement message received from each of the one or more second PEs and the status of the one or more nodes connected to the first PE, dynamically adjust configurations at the first PE, to switch between ingress filtering and egress filtering of Broadcast, Unknown Unicast, and Multicast (BUM) traffic received at the first PE.

16. The one or more non-transitory computer-readable media of claim 15, wherein the execution of the computer-readable instructions further cause the first PE to:

generate a first flood list, the first flood list encompassing all PEs in the inter-connected network of EVPNs; and generate a second flood list, the second flood list excluding any of the one or more second PEs with only a leaf indication included in the respective advertisement message received therefrom.

17. The one or more non-transitory computer-readable media of claim 16, wherein the execution of the computer-readable instructions further cause the first PE to:

receive the BUM traffic, at the first PE, from the leaf node attached to the first PE; and perform ingress filtering of the BUM traffic received at first PE from the leaf node to prevent the BUM traffic from being sent to the any of the one or more second PEs with only the leaf indication.

18. The one or more non-transitory computer-readable media of claim 17, wherein the ingress filtering includes sending the BUM traffic to all PEs included in the second flood list.

19. The one or more non-transitory computer-readable media of claim 18, wherein the BUM traffic is sent to all PEs in the second flood list with a leaf VxLAN Network Identifier (VNI) identifying the BUM traffic as being from a leaf node, the leaf VNI enabling a receiving PE from among the one or more second PEs to perform egress filtering prior to sending the BUM traffic to a leaf node associated with the receiving PE.

20. The one or more non-transitory computer-readable media of claim 16, wherein the execution of the computer-readable instructions further cause the first PE to:

receive the BUM traffic, at the first PE, from one of the one or more second PEs; and determine whether to perform egress filtering of the BUM traffic based on a VxLAN Network Identifier (VNI) associated with the BUM traffic.

* * * * *